United States Patent
Kim et al.

(10) Patent No.: US 11,019,582 B2
(45) Date of Patent: May 25, 2021

(54) METHOD FOR TRANSMITTING/RECEIVING REFERENCE SIGNAL IN WIRELESS COMMUNICATION SYSTEM, AND DEVICE THEREFOR

(71) Applicant: LG Electronics Inc., Seoul (KR)

(72) Inventors: Hyungtae Kim, Seoul (KR); Jiwon Kang, Seoul (KR); Kijun Kim, Seoul (KR); Sukhyon Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/637,899

(22) PCT Filed: Aug. 8, 2018

(86) PCT No.: PCT/KR2018/009049
§ 371 (c)(1),
(2) Date: Feb. 10, 2020

(87) PCT Pub. No.: WO2019/031854
PCT Pub. Date: Feb. 14, 2019

(65) Prior Publication Data
US 2020/0169968 A1 May 28, 2020

Related U.S. Application Data

(60) Provisional application No. 62/542,781, filed on Aug. 8, 2017.

(51) Int. Cl.
*H04W 52/42* (2009.01)
*H04W 52/32* (2009.01)
(Continued)

(52) U.S. Cl.
CPC ........... *H04W 52/42* (2013.01); *H04L 5/0016* (2013.01); *H04L 5/0048* (2013.01);
(Continued)

(58) Field of Classification Search
CPC .. H04J 13/00; H04J 13/004; H04J 2011/0006; H04L 5/00; H04L 5/0016;
(Continued)

(56) References Cited

U.S. PATENT DOCUMENTS

2010/0284394 A1* 11/2010 Takata ................. H04B 7/0632
370/343
2011/0310838 A1* 12/2011 Zheng .................. H04L 5/0023
370/330
(Continued)

FOREIGN PATENT DOCUMENTS

WO 2012/071721 A1 6/2012
WO 2017/035807 A1 3/2017

OTHER PUBLICATIONS

ZTE, "Discussion on downlink DMRS design", R1-1710196, 3GPP TSG RAN WG1 NR Ad-Hoc#2, Qingdao, P.R. China Jun. 27-30, 2017.
(Continued)

*Primary Examiner* — Tan H Trinh
(74) *Attorney, Agent, or Firm* — Dentons US LLP

(57) ABSTRACT

Disclosed are a method and a device for transmitting/receiving a reference signal by a terminal in a wireless communication system. According to the present disclosure, the terminal receives control information from a base station and receives the reference signal based on the control information. The reference signal is transmitted on a specific antenna port and is positioned in the same symbol, on a time axis, and in the same subcarrier, on a frequency axis, as a different reference signal transmitted on at least one other antenna port. A method and a device may be provided, in which an Orthogonal Cover Code (OCC) is applied to the specific antenna port and at least one other antenna port and multiplexed through a Code Division Multiplexing (CDM)

(Continued)

scheme and the OCC or a value acquired by shifting the OCC is applied to the subcarrier according to the index of the subcarrier.

16 Claims, 16 Drawing Sheets

(51) Int. Cl.
    *H04L 5/00*           (2006.01)
    *H04J 13/00*         (2011.01)
    *H04J 11/00*         (2006.01)

(52) U.S. Cl.
    CPC ......... *H04W 52/325* (2013.01); *H04J 13/004* (2013.01); *H04J 2011/0006* (2013.01)

(58) Field of Classification Search
    CPC .............. H04L 5/0048; H04W 52/325; H04W 52/346; H04W 52/42
    USPC .......... 455/69, 522, 450; 370/328, 329, 330, 370/343
    See application file for complete search history.

(56) References Cited

U.S. PATENT DOCUMENTS

| | | | | |
|---|---|---|---|---|
| 2012/0275414 A1* | 11/2012 | Hu | ............. | H04B 7/0452 370/329 |
| 2013/0142160 A1* | 6/2013 | Hoshino | ............. | H04J 13/004 370/329 |
| 2013/0294353 A1* | 11/2013 | Han | ............. | H04W 72/0406 370/329 |
| 2014/0169321 A1* | 6/2014 | Imamura | ............. | H04L 5/0035 370/329 |
| 2014/0169322 A1* | 6/2014 | Ouchi | ............. | H04W 72/042 370/329 |
| 2014/0177531 A1* | 6/2014 | Imamura | ............. | H04L 5/0035 370/328 |
| 2014/0204913 A1 | 7/2014 | Hu et al. | | |
| 2014/0241303 A1* | 8/2014 | Yoon | ............. | H04L 27/2613 370/329 |
| 2014/0370904 A1* | 12/2014 | Smith | ............. | H04W 8/005 455/450 |
| 2015/0223245 A1* | 8/2015 | Cheng | ............. | H04W 24/10 370/329 |
| 2016/0006548 A1* | 1/2016 | Yang | ............. | H04L 1/1812 370/329 |
| 2016/0192398 A1* | 6/2016 | Wang | ............. | H04J 13/0003 370/329 |
| 2016/0278003 A1* | 9/2016 | Kim | ............. | H04L 5/00 |
| 2017/0012753 A1* | 1/2017 | Kim | ............. | H04L 5/0053 |
| 2017/0078863 A1* | 3/2017 | Kim | ............. | H04W 48/16 |
| 2017/0331602 A1* | 11/2017 | Hugl | ............. | H04L 5/0094 |
| 2018/0287682 A1* | 10/2018 | Kwak | ............. | H04L 5/0057 |
| 2018/0309553 A1* | 10/2018 | Cao | ............. | H04L 5/0094 |
| 2019/0182088 A1* | 6/2019 | Shimizu | ............. | H04L 1/0061 |
| 2019/0327012 A1* | 10/2019 | Park | ............. | H04W 24/08 |
| 2020/0092876 A1* | 3/2020 | Cho | ............. | H04W 72/0413 |
| 2020/0204335 A1* | 6/2020 | Kim | ............. | H04L 5/10 |
| 2020/0236712 A1* | 7/2020 | Kwak | ............. | H04B 7/26 |

OTHER PUBLICATIONS

ITL, "DMRS pattern configuration for NR", R1-1711350, 3GPP TSG RAN WG1 NR Ad-Hoc#2, Qingdao, P.R. China Jun. 27-30, 2017.

* cited by examiner

【FIG. 1】
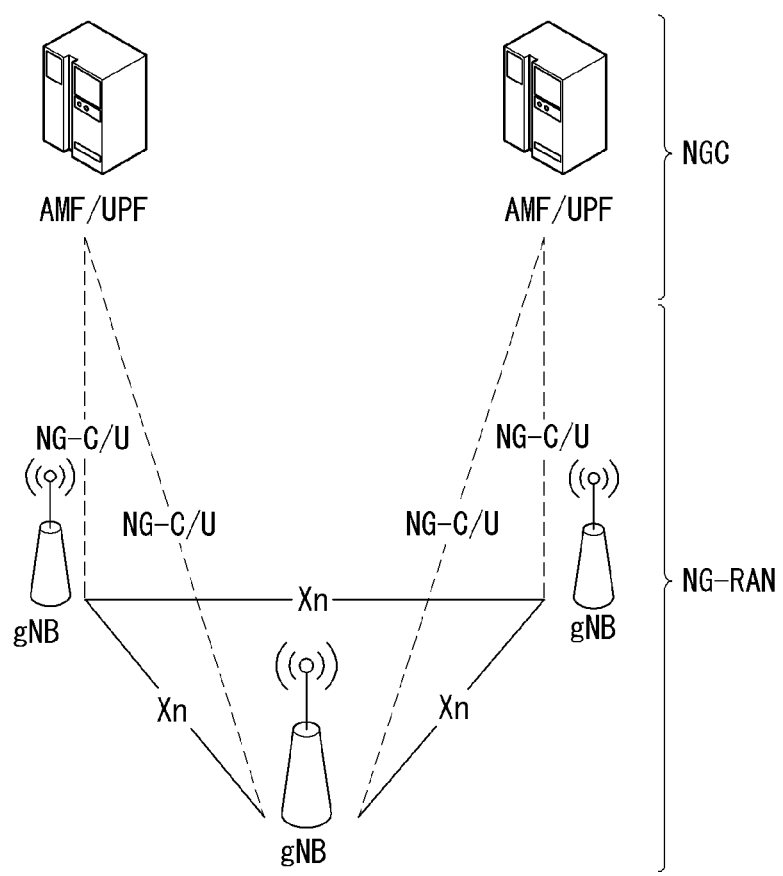

[FIG. 2]
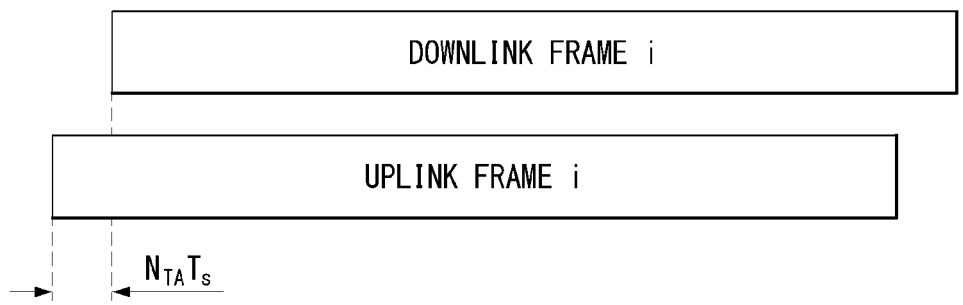

[FIG. 3]
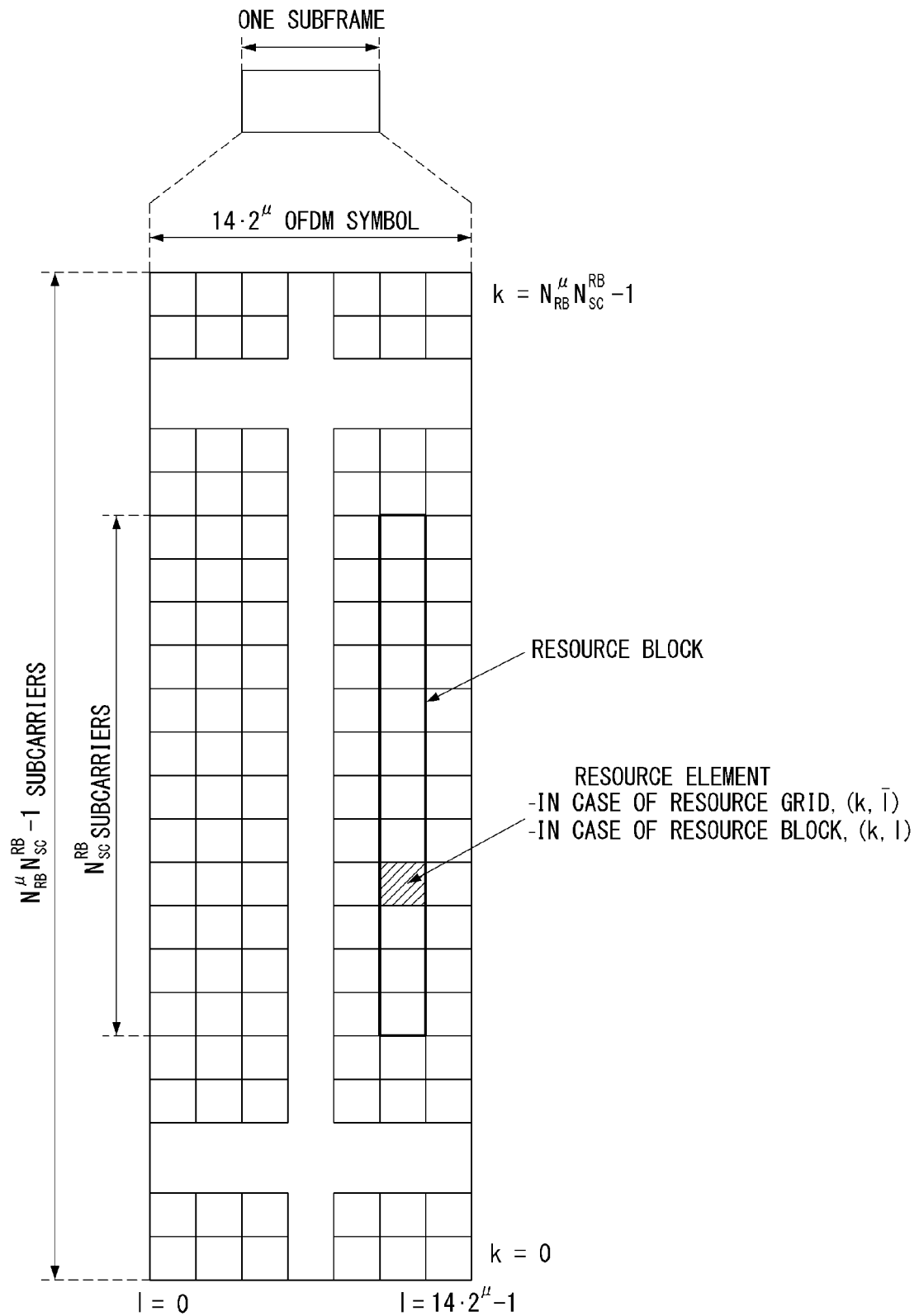

[FIG. 4]
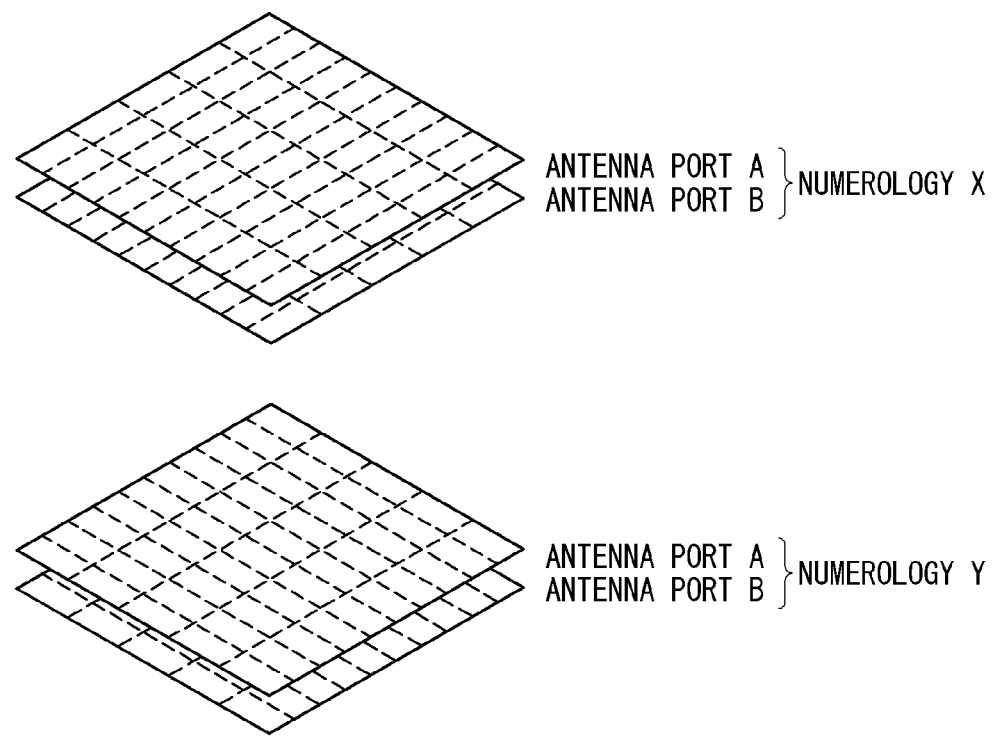

[FIG. 5]
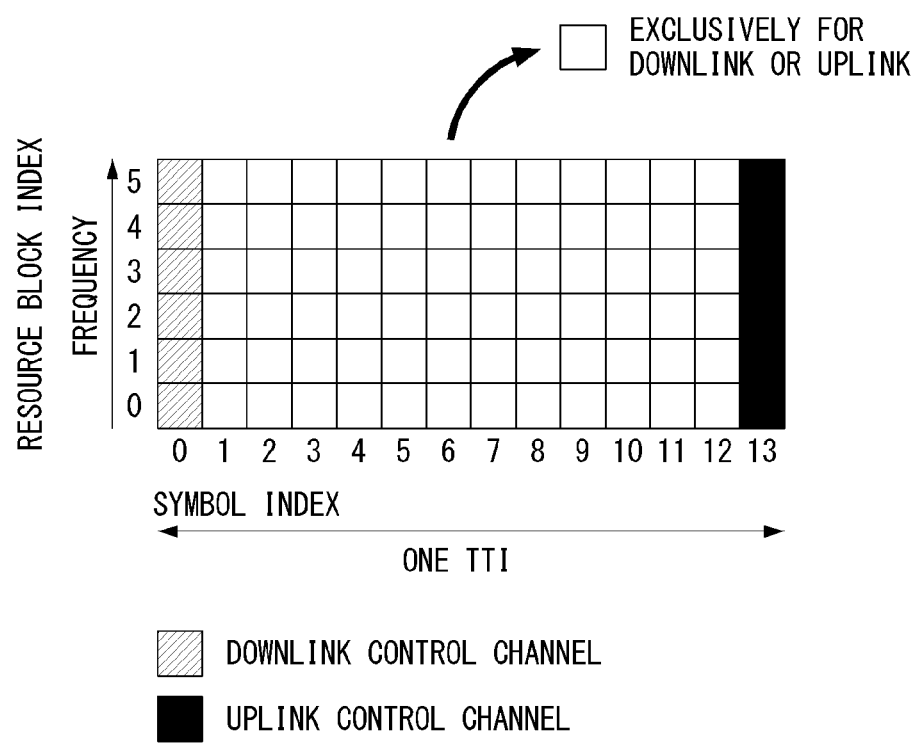

[FIG. 6]
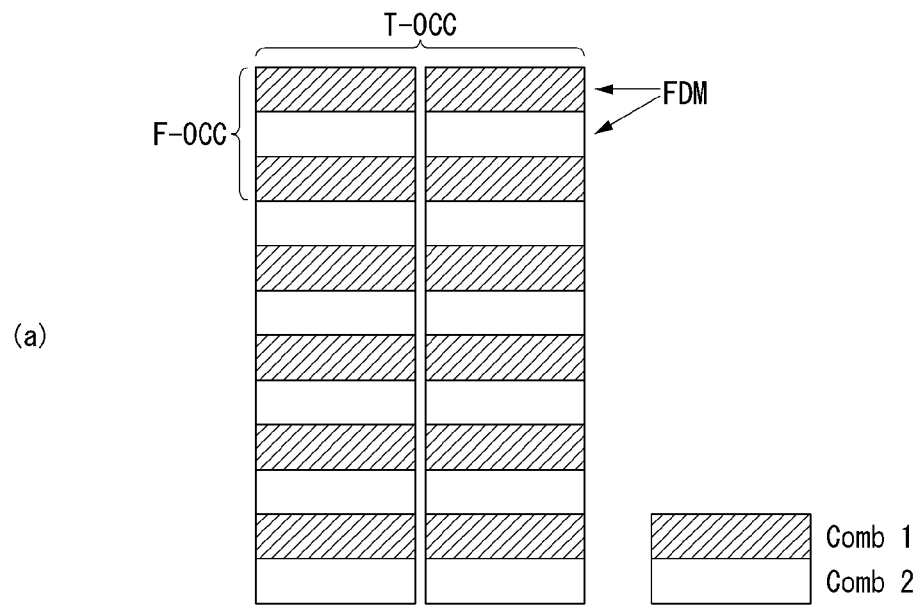
(a)
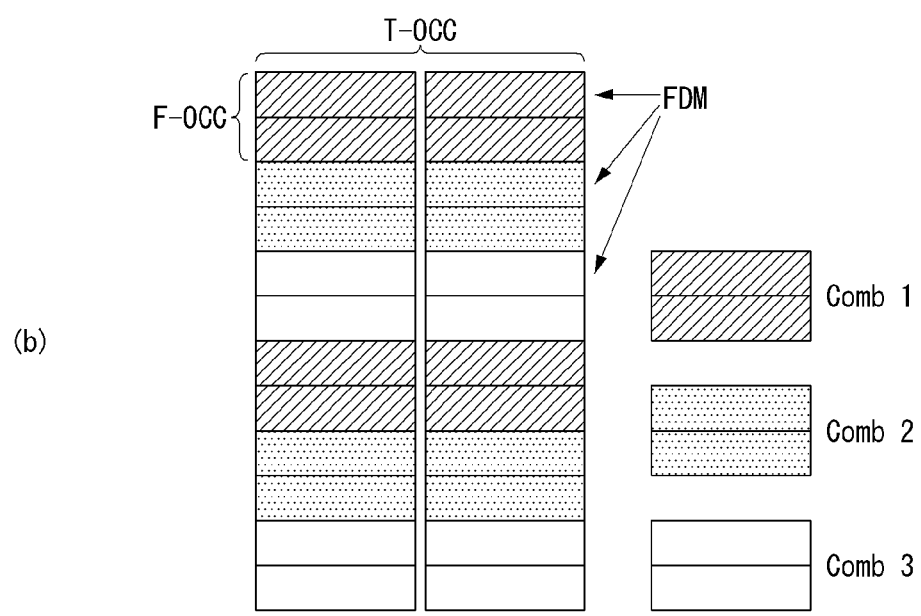
(b)

[FIG. 7]
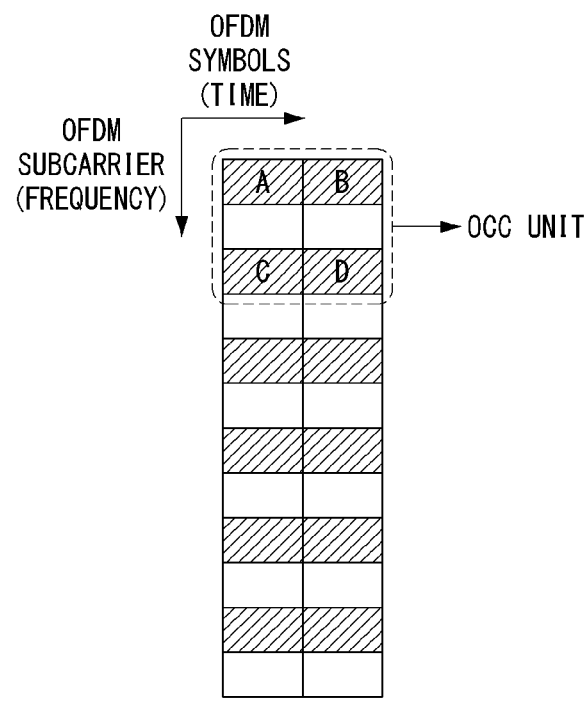

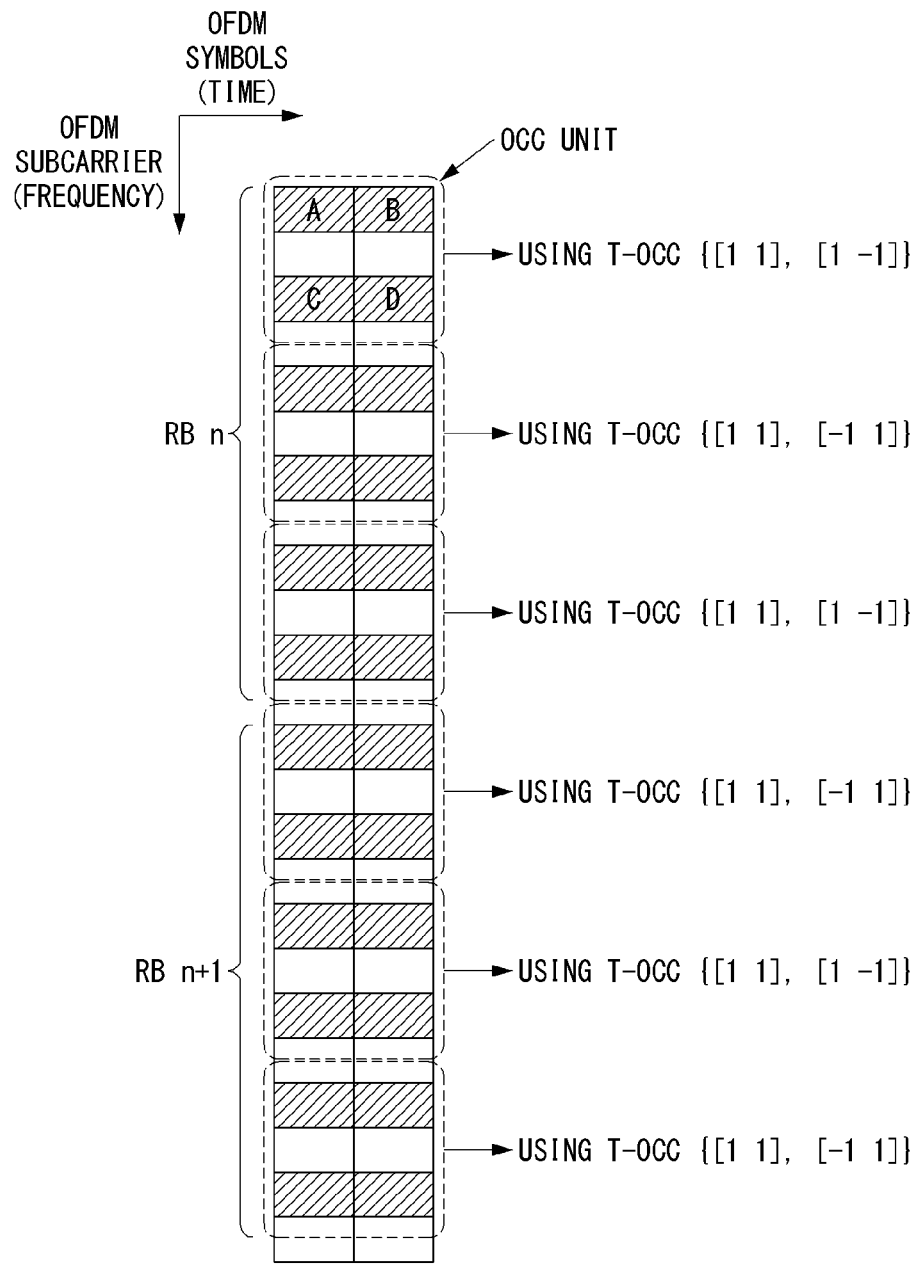
[FIG. 8]

[FIG. 9]
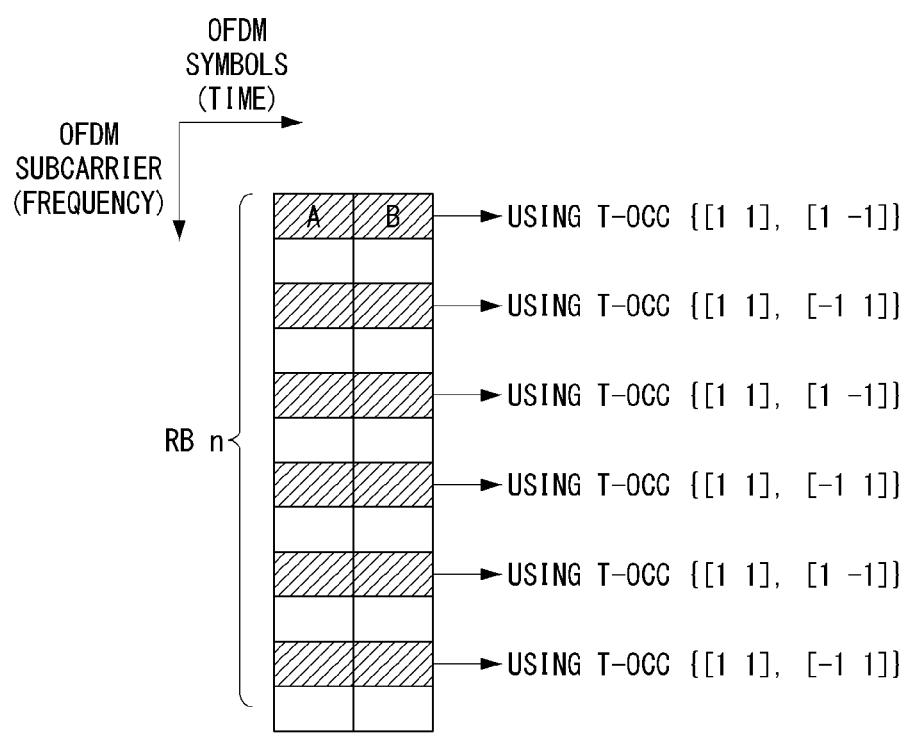

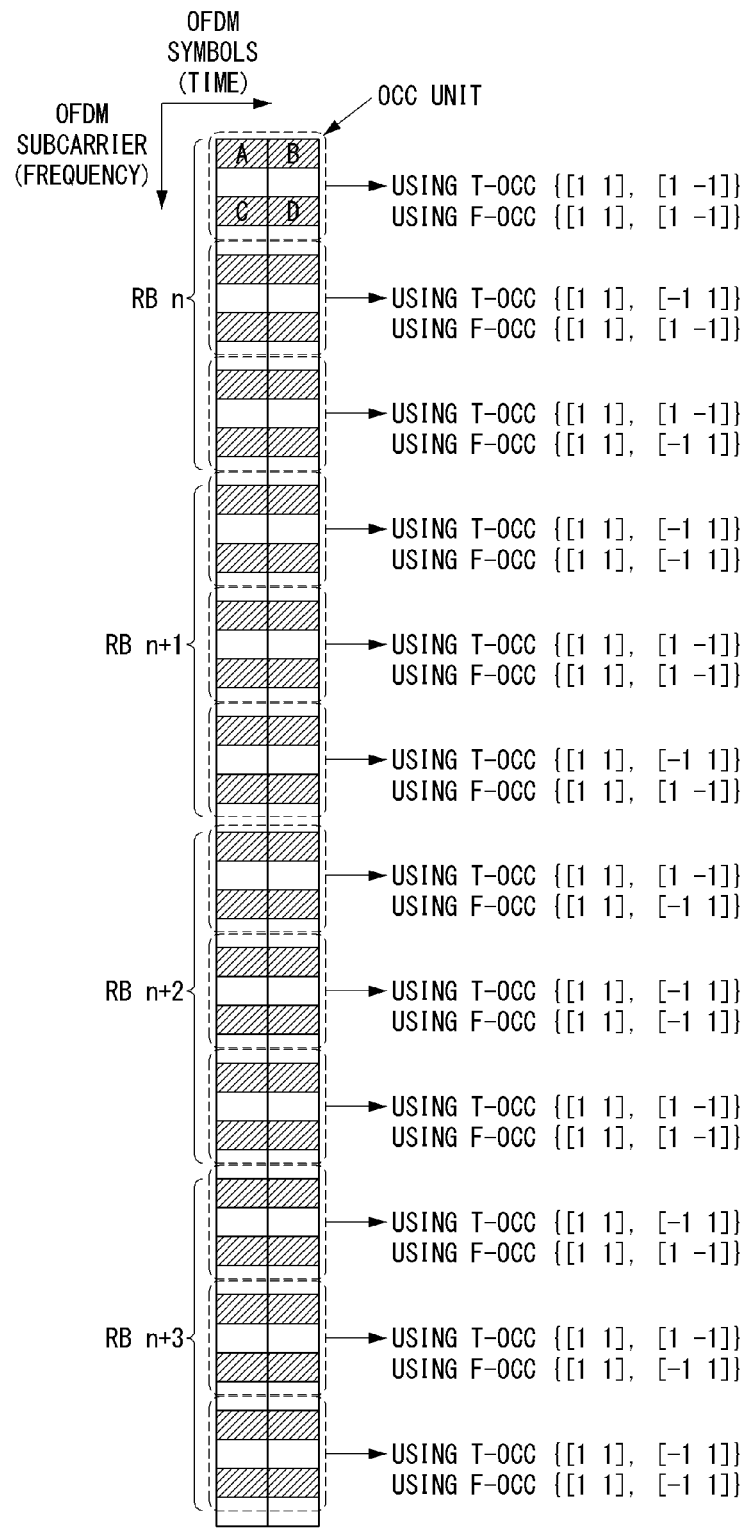
[FIG. 10]

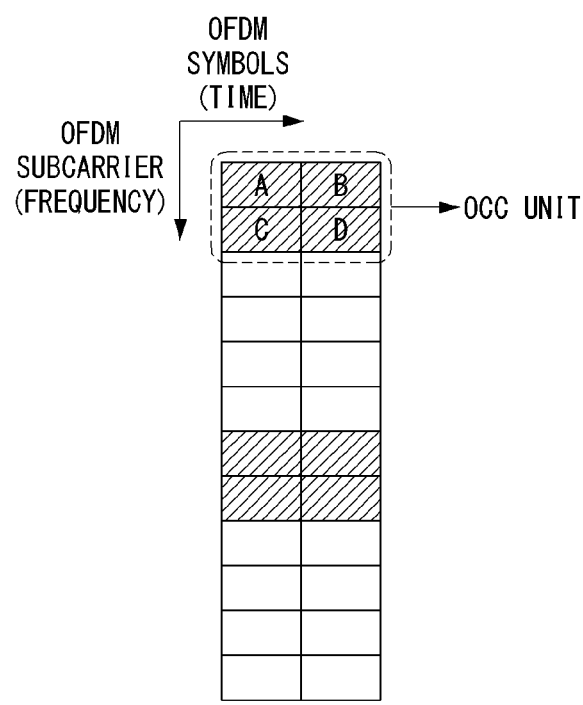
[FIG. 11]

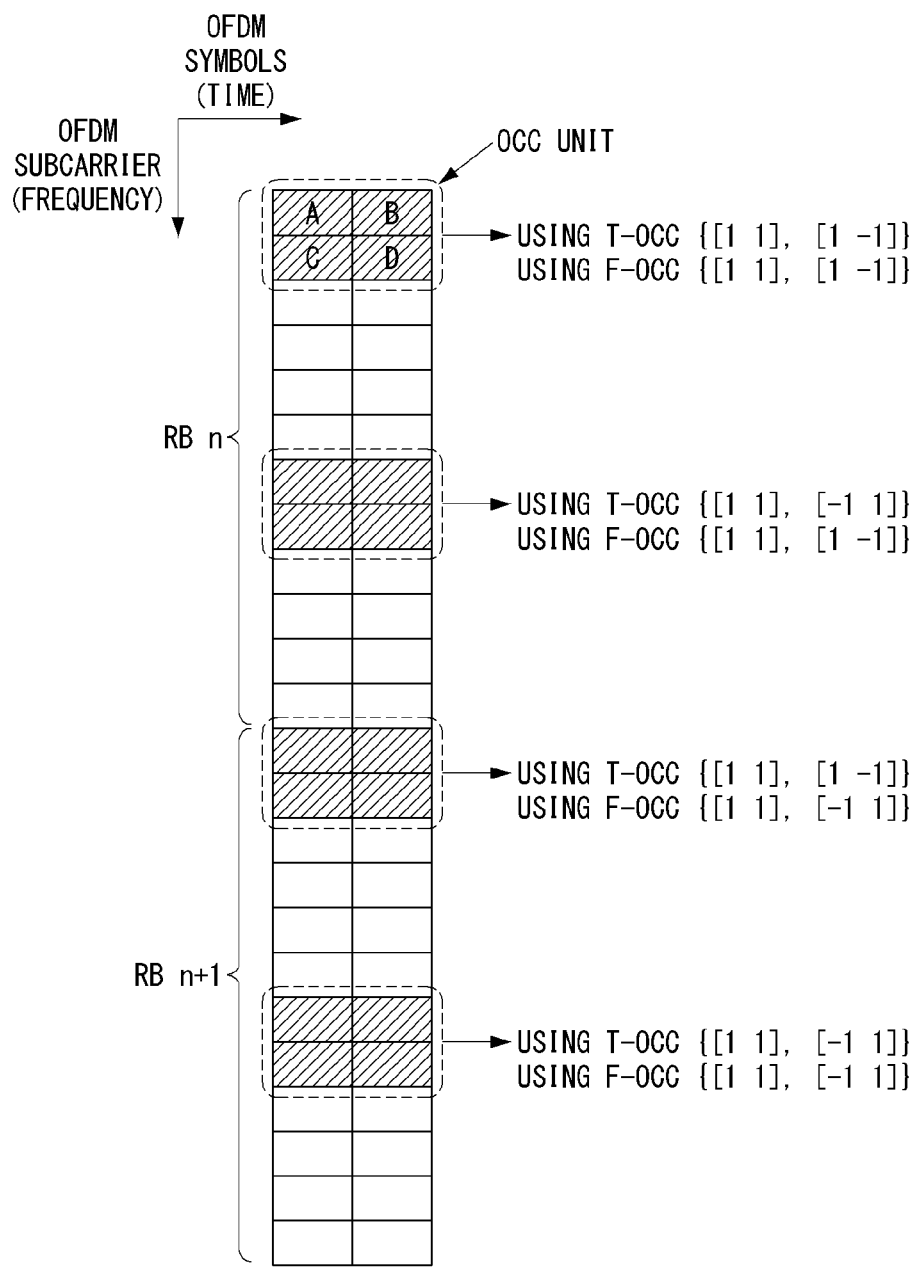
[FIG. 12]

[FIG. 13]
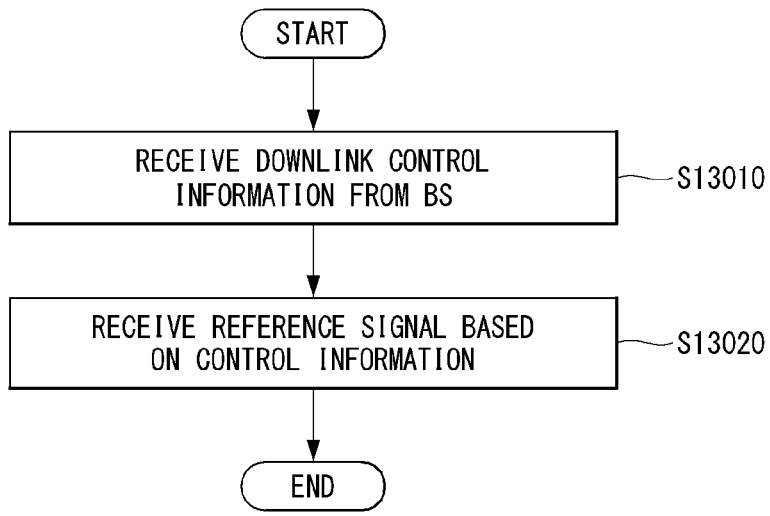
[FIG. 14]
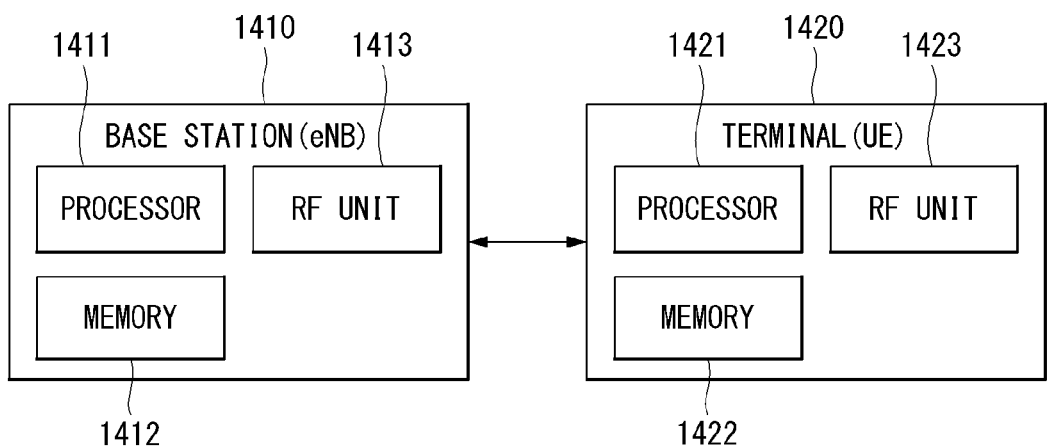

[FIG. 15]
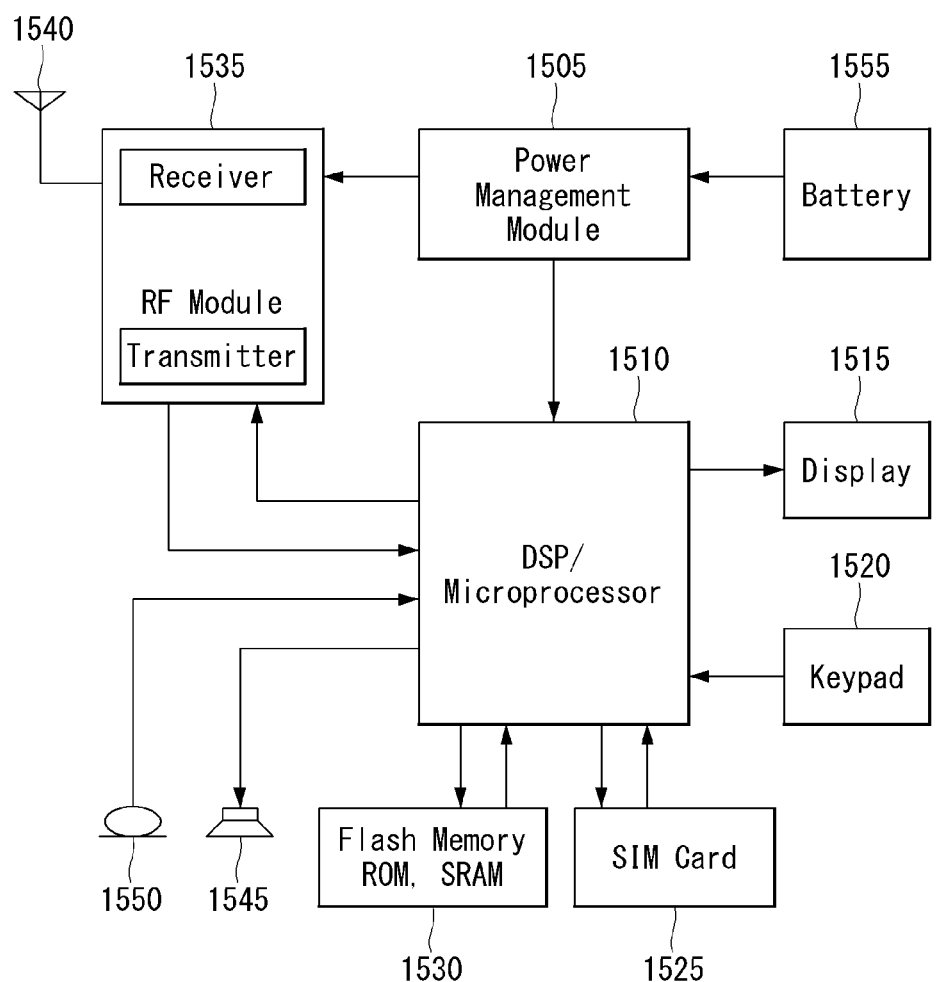

[FIG. 16]
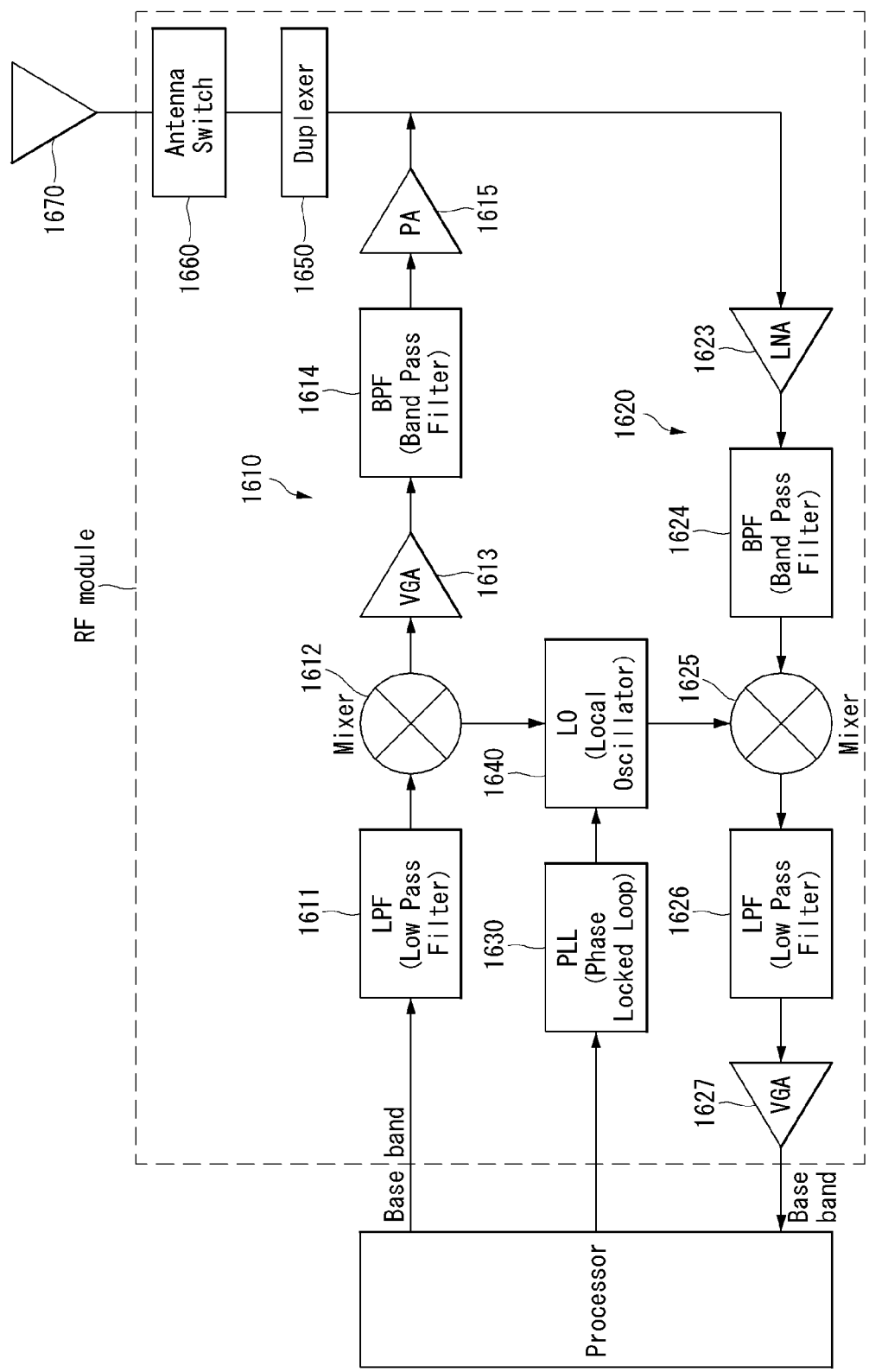

[FIG. 17]
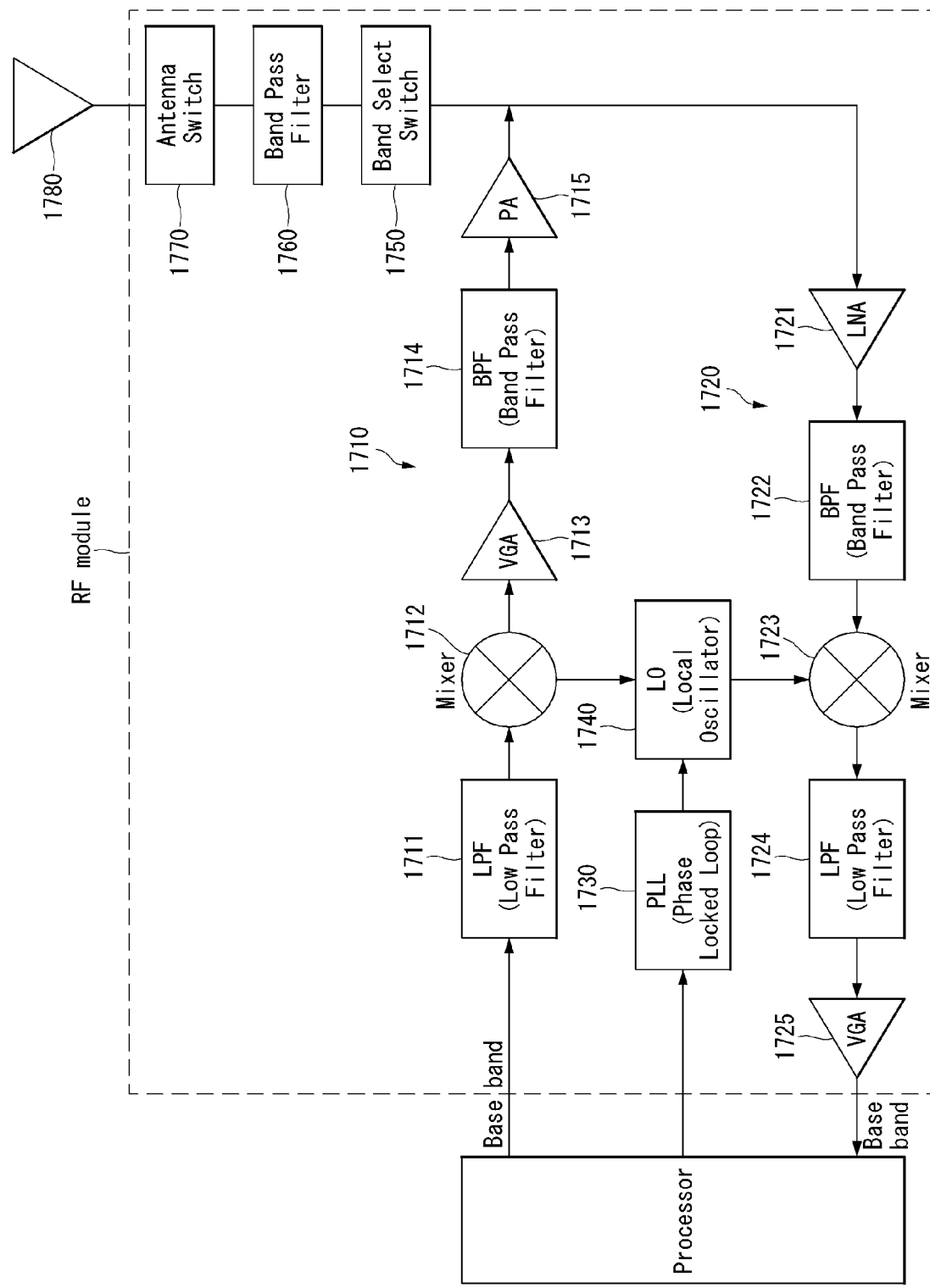

METHOD FOR TRANSMITTING/RECEIVING REFERENCE SIGNAL IN WIRELESS COMMUNICATION SYSTEM, AND DEVICE THEREFOR

This application is the National Stage filing under 35 U.S.C. 371 of International Application No. PCT/KR2018/009049, filed on Aug. 8, 2018, which claims the benefit of U.S. Provisional Application No. 62/542,781 filed on Aug. 8, 2017, the contents of which are all hereby incorporated by reference herein in their entirety.

TECHNICAL FIELD

The present disclosure relates to a wireless communication system, and more particularly, to a method and a device for determining transmission power between antenna ports for transmitting a reference signal in a wireless communication system.

BACKGROUND ART

Mobile communication systems have been generally developed to provide voice services while guaranteeing user mobility. Such mobile communication systems have gradually expanded their coverage from voice services through data services up to high-speed data services. However, as current mobile communication systems suffer resource shortages and users demand even higher-speed services, development of more advanced mobile communication systems is needed.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive multiple input multiple output (MIMO), in-band full duplex, non-orthogonal multiple access (NOMA), supporting super-wide band, and device networking, have been researched.

DISCLOSURE

Technical Problem

The present disclosure has been made in an effort to provide a method and a device for transmitting/receiving a Reference Signal (RS) in a wireless communication system.

Furthermore, the present disclosure has been made in an effort to provide a method and a device for determining transmission power between antenna ports for transmitting a Demodulation Reference Signal (DMRS) in a wireless communication system.

Furthermore, the present disclosure has been made in an effort to provide a method and a device for evenly configuring transmission power between antenna ports using an orthogonal cover code (OCC) for applying CDM when antenna ports for transmitting a reference signal are multiplexed through code division multiplexing (CDM).

Further, the present disclosure has been made in an effort to provide a method and a device for making a balance among transmission powers of a plurality of physical antenna ports when a reference signal is transmitted through the plurality of physical antenna ports.

The technical objects of the present disclosure are not limited to the aforementioned technical objects, and other technical objects, which are not mentioned above, will be apparently appreciated by a person having ordinary skill in the art from the following description.

Technical Solution

In an aspect, provided is a method for method for transmitting/receiving a reference signal by a terminal in a wireless communication system, which includes: receiving control information from a base station; and receiving the reference signal based on the control information, in which the reference signal is transmitted on a specific antenna port and is positioned in the same symbol, on a time axis, and in the same subcarrier, on a frequency axis, as a different reference signal transmitted on at least one other antenna port, the specific antenna port and the at least one other antenna port are multiplexed by a code division multiplexing (CDM) method by having an orthogonal code (OCC) applied thereto, and the subcarrier is applied thereto, according to an index of the subcarrier, the OCC or a value derived as a result of the shifting of the OCC.

Furthermore, in the present disclosure, when the index is an even number, the subcarrier includes the value derived as the result of the shifting of the OCC applied thereto, and when the index is an odd number, the subcarrier includes the OCC applied thereto.

Furthermore, in the present disclosure, when the OCC applied to the subcarrier in which the index is the even number is [1 −1], the OCC to applied to the subcarrier in which the index is the odd number is [−1 1].

Further, in the present disclosure, when the index is the odd number, the subcarrier includes the value derived as the result of the shifting of the OCC applied thereto, and when the index is the even number, the subcarrier includes the OCC applied thereto.

Furthermore, in the present disclosure, when the OCC applied to the subcarrier in which the index is the odd number is [1 −1], the OCC to applied to the subcarrier in which the index is the even number is [−1 1].

Furthermore, in the present disclosure, the number of specific antenna ports and the number of at least one other port are two or less in order to evenly apply transmission power on a physical antenna port.

Furthermore, in the present disclosure, the index of the subcarrier is the odd or even number, whether the OCC or the value derived as a result of the shifting of the OCC is applied is indicated by the base station.

Furthermore, in the present disclosure, the reference signal is a Demodulation Reference Signal (DMRS) for demodulation of data.

In another aspect, provided is a terminal transmitting/receiving a reference signal in a wireless communication system, which includes: a radio frequency (RF) module transmitting and receiving a radio signal; and a processor controlling the RF module, in which the processor is configured to receive control information from a base station, and receive the reference signal based on the control information, the reference signal is transmitted on a specific antenna port and is positioned in the same symbol, on a time axis, and in the same subcarrier, on a frequency axis, as a different reference signal transmitted on at least one other antenna port, the specific antenna port and the at least one other antenna port are multiplexed by a code division multiplexing (CDM) method by having an orthogonal code (OCC) applied thereto, and the subcarrier is applied thereto, according to an index of the subcarrier, the OCC or a value derived as a result of the shifting of the OCC.

Advantageous Effects

According to an embodiment of the present disclosure, transmission powers between antenna ports for transmitting a reference signal can be evenly configured.

Furthermore, according to an embodiment of the present disclosure, when the antenna ports for transmitting the reference signal are multiplexed through CDM, a balance can be made between transmission powers of the antenna ports using an OCC for applying the CDM.

Furthermore, according to an embodiment of the present disclosure, the transmission power balance between the antenna ports is made to efficiently design a terminal.

Advantages which can be obtained in the present disclosure are not limited to the aforementioned advantages and other unmentioned advantages will be clearly understood by those skilled in the art from the following description.

DESCRIPTION OF DRAWINGS

In order to help understanding of the present disclosure, the accompanying drawings which are included as a part of the Detailed Description provide embodiments of the present disclosure and describe the technical features of the present disclosure together with the Detailed Description.

FIG. 1 is a diagram illustrating an example of an overall system structure of NR to which a method proposed in the present disclosure may be applied.

FIG. 2 illustrates a relationship between an uplink frame and a downlink frame in a wireless communication system to which the method proposed in the present disclosure may be applied.

FIG. 3 illustrates an example of a resource grid supported in the wireless communication system to which the method proposed in the present disclosure may be applied.

FIG. 4 illustrates examples of resource grids for each antenna port and numerology to which the method proposed in the present disclosure may be applied.

FIG. 5 illustrates a self-contained subframe structure to which the present disclosure may be applied.

FIG. 6 illustrates an example of a mapping pattern of a demodulation reference signal to which the method proposed in the present disclosure may be applied.

FIG. 7 is a diagram illustrating one example of configuring antenna ports for transmitting a reference signal.

FIG. 8 is a diagram illustrating one example of a method for determining transmission powers between antenna ports using an orthogonal cover code proposed in the present disclosure.

FIG. 9 is a diagram illustrating another example of a method for determining transmission powers between antenna ports using an orthogonal cover code proposed in the present disclosure.

FIG. 10 is a diagram illustrating yet another example of a method for determining transmission powers between antenna ports using an orthogonal cover code proposed in the present disclosure.

FIG. 11 is a diagram illustrating still yet another example of a method for determining transmission powers between antenna ports using an orthogonal cover code proposed in the present disclosure.

FIG. 12 is a diagram illustrating another example of a method for determining transmission powers between antenna ports using an orthogonal cover code proposed in the present disclosure.

FIG. 13 is a flowchart showing one example of a method for receiving a reference signal by a UE, which is proposed in the present disclosure.

FIG. 14 is a block diagram of a wireless communication device to which methods proposed in the present disclosure may be applied.

FIG. 15 is a block diagram of a communication device according to an embodiment of the present disclosure.

FIG. 16 is a diagram illustrating one example of an RF module of a wireless communication device to which a method proposed in the present disclosure may be applied.

FIG. 17 is a diagram illustrating another example of an RF module of a wireless communication device to which a method proposed in the present disclosure may be applied.

MODE FOR INVENTION

Some embodiments of the present disclosure are described in detail with reference to the accompanying drawings. A detailed description to be disclosed along with the accompanying drawings is intended to describe some exemplary embodiments of the present disclosure and is not intended to describe a sole embodiment of the present disclosure. The following detailed description includes more details in order to provide full understanding of the present disclosure. However, those skilled in the art will understand that the present disclosure may be implemented without such more details.

In some cases, in order to avoid making the concept of the present disclosure vague, known structures and devices are omitted or may be shown in a block diagram form based on the core functions of each structure and device.

In the present disclosure, a base station has the meaning of a terminal node of a network over which the base station directly communicates with a terminal. In this document, a specific operation that is described to be performed by a base station may be performed by an upper node of the base station according to circumstances. That is, it is evident that in a network including a plurality of network nodes including a base station, various operations performed for communication with a terminal may be performed by the base station or other network nodes other than the base station. The base station (BS) may be substituted with another term, such as a fixed station, a Node B, an eNB (evolved-NodeB), a base transceiver system (BTS), or an access point (AP). Furthermore, the terminal may be fixed or may have mobility and may be substituted with another term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-Machine (M2M) device, or a device-to-device (D2D) device.

Hereinafter, downlink (DL) means communication from a base station to UE, and uplink (UL) means communication from UE to a base station. In DL, a transmitter may be part of a base station, and a receiver may be part of UE. In UL, a transmitter may be part of UE, and a receiver may be part of a base station.

Specific terms used in the following description have been provided to help understanding of the present disclosure, and the use of such specific terms may be changed in various forms without departing from the technical sprit of the present disclosure.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

In addition, 5G NR (new radio) defines eMBB (enhanced Mobile Broadband), mMTC (massive Machine Type Communications), URLLC (Ultra-Reliable and Low Latency Communications) and V2X (vehicle-to-everything), according to a usage scenario.

And, 5G NR standard is distinguished into standalone (SA) and non-standalone (NSA) according to co-existence between NR system and LTE system.

Further, 5G NR supports various types of subcarrier spacing, and supports CP-OFDM in downlink, and supports CP-OFDM and DFT-s-OFDM (SC-OFDM) in uplink.

Embodiments of the present disclosure may be supported by the standard documents disclosed in at least one of IEEE 802, 3GPP, and 3GPP2, that is, radio access systems. That is, steps or portions that belong to the embodiments of the present disclosure and that are not described in order to clearly expose the technical spirit of the present disclosure may be supported by the documents. Furthermore, all terms disclosed in this document may be described by the standard documents.

In order to more clarify a description, 3GPP LTE/LTE-A, NR (New RAT) is chiefly described, but the technical characteristics of the present disclosure are not limited thereto.

Definition of Terms eLTE eNB: An eLTE eNB is an evolution of an eNB that supports a connection for an EPC and an NGC.

gNB: A node for supporting NR in addition to a connection with an NGC

New RAN: A radio access network that supports NR or E-UTRA or interacts with an NGC Network slice: A network slice is a network defined by an operator so as to provide a solution optimized for a specific market scenario that requires a specific requirement together with an inter-terminal range.

Network function: A network function is a logical node in a network infra that has a well-defined external interface and a well-defined functional operation.

NG-C: A control plane interface used for NG2 reference point between new RAN and an NGC NG-U: A user plane interface used for NG3 reference point between new RAN and an NGC Non-standalone NR: A deployment configuration in which a gNB requires an LTE eNB as an anchor for a control plane connection to an EPC or requires an eLTE eNB as an anchor for a control plane connection to an NGC Non-standalone E-UTRA: A deployment configuration an eLTE eNB requires a gNB as an anchor for a control plane connection to an NGC.

User plane gateway: A terminal point of NG-U interface

General System

FIG. 1 is a diagram illustrating an example of an overall structure of a new radio (NR) system to which a method proposed by the present disclosure may be implemented.

Referring to FIG. 1, an NG-RAN is composed of gNBs that provide an NG-RA user plane (new AS sublayer/PDCP/RLC/MAC/PHY) and a control plane (RRC) protocol terminal for a UE (User Equipment).

The gNBs are connected to each other via an Xn interface.

The gNBs are also connected to an NGC via an NG interface.

More specifically, the gNBs are connected to a Access and Mobility Management Function (AMF) via an N2 interface and a User Plane Function (UPF) via an N3 interface.

NR (New Rat) Numeroloqy and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or µ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an Orthogonal Frequency Division Multiplexing (OFDM) numerology and a frame structure, which may be considered in the NR system, will be described.

A plurality of OFDM numerologies supported in the NR system may be defined as in Table 1.

TABLE 1

| µ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$ DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max} N_f/100) \cdot T_s=1$ ms. In this case, there may be a set of UL frames and a set of DL frames.

FIG. 2 illustrates a relationship between a UL frame and a DL frame in a wireless communication system to which a method proposed by the present disclosure may be implemented.

As illustrated in FIG. 2, a UL frame number I from a User Equipment (UE) needs to be transmitted $T_{TA}=N_{TA}T_s$ before the start of a corresponding DL frame in the UE.

Regarding the numerology µ, slots are numbered in ascending order of $n_s^\mu \in \{0, \ldots, N_{subframe}^{slots,\mu}-1\}$ in a subframe, and in ascending order of $n_{s,f}^\mu \in \{0, \ldots,$ $N_{frame}^{slots,\mu}-1$} in a radio frame. One slot is composed of continuous OFDM symbols of $N_{symb}^{\mu}$, and $N_{symb}^{\mu}$ is determined depending on a numerology in use and slot configuration. The start of slots $n_s^{\mu}$ in a subframe is temporally aligned with the start of OFDM symbols $n_s^{\mu}N_{symb}^{\mu}$ in the same subframe.

Not all UEs are able to transmit and receive at the same time, and this means that not all OFDM symbols in a DL slot or an UL slot are available to be used.

Table 2 shows the number of OFDM symbols per slot for a normal CP in the numerology μ, and Table 3 shows the number of OFDM symbols per slot for an extended CP in the numerology μ.

TABLE 2

| | Slot configuration | | | | | |
|---|---|---|---|---|---|---|
| | 0 | | | 1 | | |
| μ | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | — | — | — |
| 4 | 14 | 160 | 16 | — | — | — |
| 5 | 14 | 320 | 32 | — | — | — |

TABLE 3

| | Slot configuration | | | | | |
|---|---|---|---|---|---|---|
| | 0 | | | 1 | | |
| μ | $N_{symb}^{\mu}$ | $N_{frame}^{slots,\mu}$ | $N_{subframe}^{slots,\mu}$ | $N_{symb}^{\mu}$ | $N_{frame}^{slots,\mu}$ | $N_{subframe}^{slots,\mu}$ |
| 0 | 12 | 10 | 1 | 6 | 20 | 2 |
| 1 | 12 | 20 | 2 | 6 | 40 | 4 |
| 2 | 12 | 40 | 4 | 6 | 80 | 8 |
| 3 | 12 | 80 | 8 | — | — | — |
| 4 | 12 | 160 | 16 | — | — | — |
| 5 | 12 | 320 | 32 | — | — | — |

NR Physical Resource

Regarding physical resources in the NR system, an antenna port, a resource grid, a resource element, a resource block, a carrier part, etc. may be considered.

Hereinafter, the above physical resources possible to be considered in the NR system will be described in more detail.

First, regarding an antenna port, the antenna port is defined such that a channel over which a symbol on one antenna port is transmitted can be inferred from another channel over which a symbol on the same antenna port is transmitted. When large-scale properties of a channel received over which a symbol on one antenna port can be inferred from another channel over which a symbol on another antenna port is transmitted, the two antenna ports may be in a QC/QCL (quasi co-located or quasi co-location) relationship. Herein, the large-scale properties may include at least one of delay spread, Doppler spread, Doppler shift, average gain, and average delay.

FIG. 3 illustrates an example of a resource grid supported in a wireless communication system to which a method proposed by the present disclosure may be implemented.

Referring to FIG. 3, a resource grid is composed of $N_{RB}^{\mu}N_{sc}^{RB}$ subcarriers in a frequency domain, each sub- frame composed of $14 \cdot 2\mu$ OFDM symbols, but the present disclosure is not limited thereto.

In NR system, a transmitted signal is described by one or more resource grids including $N_{RB}^{\mu}N_{sc}^{RB}$ subcarriers and $2^{\mu}N_{symb}^{(\mu)}$ OFDM symbols. Here, $N_{RB}^{\mu} \leq N_{RB}^{max,\mu}$. The $N_{RB}^{max,\mu}$, represents a maximum transmission bandwidth, and this may be changed between uplink and downlink as well as numerologies.

In this case, as shown in FIG. 3, a single resource grid may be configured for numerology μ and antenna port p.

FIG. 4 illustrates examples of resource grids for each antenna port and numerology to which the method proposed in the present disclosure may be applied.

Each element of resource grid for numerology μ and antenna port p may be indicated by a resource element, and uniquely distinguished by an index pair (k,l) Here, $k=0, \ldots, N_{RB}^{\mu}N_{sc}^{RB}-1$ is an index on a frequency domain, and $l=0, \ldots, 2^{\mu}N_{symb}^{(\mu)}-1$ symb indicates a symbol position in a subframe. In a slot, when a resource element is indicated, an index pair (k,l) is used. Here, $l=0, \ldots, N_{symb}^{\mu}-1$.

Resource element (k,l) for numerology μ and antenna port p corresponds to a complex value $a_{k,l}^{(p,\mu)}$. In the case that there is no risk of confusion or in the case that a specific antenna port or numerology is not specified, indexes p and μ may be dropped, and as a result, the complex value may become $a_{k,l}^{(p)}$ or $a_{k,l}$.

In addition, a physical resource block is defined by $N_{sc}^{RB}$ 12 consecutive subcarriers in a frequency domain. On a frequency domain, numbers of 0 to $N_{RB}^{\mu}-1$ are designated to physical resources. At this time, the relation between physical resource block number $n_{PRB}$ and resource elements (k,l) are given by Equation 1.

$$n_{PRB} = \left\lfloor \frac{k}{N_{sc}^{RB}} \right\rfloor \quad \text{[Equation 1]}$$

In addition, with respect to a carrier part, a UE may be configured to receive or transmit using a subset of a resource grid only. At this time, numbers of 0 to $N_{URB}^{\mu}-1$ are designated to a set of a resource block configured to receive or transmit by a UE on a frequency domain.

Hereinafter, before describing the methods proposed in the present disclosure in detail, the contents directly/indirectly related to the methods proposed in the present disclosure are described briefly.

In next generation communication such as 5G, New Rat (NR), and the like, as more communication devices require greater communication capacity, the need of mobile broadband communication more advanced than the conventional RAT (radio access technology) has been issued.

Also, massive MTC (Machine Type Communications) technology that provides various services anywhere and at any time by connecting a plurality of devices and things is one of main issues which will be considered in next generation communication.

Furthermore, a communication system design or structure considering service and/or UE susceptible to reliability and latency has been discussed.

As such, the introduction of the next generation radio access technology (RAT) has been discussed, considering enhanced mobile broadband (eMBB) communication, massive MTC (mMTC), URLLC (Ultra-Reliable and Low Latency Communication), and the like, and the corresponding technology will be referred to as 'New RAT (NR)' in the present disclosure, for the convenience of description.

Self-Contained Subframe Structure

FIG. 5 illustrates a self-contained subframe structure to which the present disclosure may be applied.

In TDD system, in order to minimize data transmission delay, the self-contained subframe structure as shown in FIG. 4 has been considered in 5 Generation (5G) new RAT.

The shaded area (symbol index 0) in FIG. 5 shows a downlink (DL) control region, and the dark area (symbol index 13) shows an uplink (UL) control region. The area not marked may be used for a DL data transmission or a UL data transmission. In the characteristics of such a structure, a DL transmission and a UL transmission may be sequentially progressed in a subframe, a DL data may be transmitted and a UL ACK/NACK may be received in a subframe. Consequently, a time required for retransmitting data is reduced when a data transmission error occurs, and owing to this, the latency till the last data forwarding may be minimized.

In such a self-contained subframe structure, a time gap is required for a process that an eNB and a UE switch from a transmission mode to a reception mode or a process that an eNB and a UE switch from a reception mode to a transmission mode. For this, a part of OFDM symbols on the timing switching from DL to UL may be configured as GP in the self-contained subframe structure.

Feedback of Channel State Information (CSI)

In a 3GPP LTE/LTE-A system, user equipment (UE) is defined to report channel state information (CSI) to a base station (BS or eNB).

The CSI collectively refers to information that can indicate the quality of a radio channel (or referred to as a link) formed between the UE and the antenna port. For example, a rank indicator (RI), a precoding matrix indicator (PMI), a channel quality indicator (CQI), and the like correspond to the information.

Here, the RI represents rank information of a channel, which means the number of streams received by the UE through the same time-frequency resource. Since this value is determined depending on the long term fading of the channel, the value is fed back from the UE to the BS with a period usually longer than the PMI and the CQI. The PMI is a value reflecting a channel space characteristic and represents a preferred precoding index preferred by the UE based on a metric such as signal-to-interference-plus-noise ratio (SINR). The CQI is a value representing the strength of the channel, and generally refers to a reception SINR that can be obtained when the BS uses the PMI.

In the 3GPP LTE/LTE-A system, the BS configures a plurality of CSI processes to the UE and may receive CSI for each process. Here, the CSI process is constituted by a CSI-RS for signal quality measurement from the BS and a CSI-interference measurement (CSI-IM) resource for interference measurement.

Reference Signal (RS) Virtualization

In mmW, a PDSCH may be transmitted in only one analog beam direction at one time by analog beamforming. In this case, data transmission is available from an eNB to a small number of UEs in the corresponding direction. Therefore, on occasion demands, by differently configuring an analog beam direction for each antenna port, data transmission may be performed to multiple UEs in several analog beam directions simultaneously.

FIG. 6 illustrates an example of a mapping pattern of a demodulation reference signal to which the method proposed in the present disclosure may be applied.

Referring to FIG. 6, a demodulation reference signal for demodulating data in NR may be classified into type 1 and type 2 depending on the mapping format, and may be mapped to one or two symbols.

Particularly, in NR, a demodulation reference signal may be classified into Front load DMRS and additional DMRS. The Front load DMRS may be located at a front symbol of a slot for fast decoding, and may occupy one or two symbols indicated by Downlink Control Information (DCI) and/or RRC.

In the case of slot-based scheduling, in the Front load DMRS, the first DMRS is located at the third or fourth symbol indicated by a Physical Broadcast Channel (PBCH), which is a broadcast channel.

In the case of non-slot-based scheduling, in the Front load DMRS, the first DMRS is located at the first symbol of PDSCH/PUSCH.

In the case of fast speed UE, the additional DMRS may be configured, and located around middle/the last symbol.

The additional DMRS, in the case that the Front load DMRS is configured at one symbol, may occupy the symbol equally spread over 0, 1, 2 or 3 symbols. In the case that the Front load DMRS is configured at two symbols, the additional DMRS may occupy zero or two symbols.

The Front load DMRS may have two mapping types (type 1 and type 2) as shown in FIGS. 6(a) and 6(b), and may be mapped according to the type indicated by RRC between two mapping types.

Hereinafter, (a) is referred to as type 1, and (b) is referred to as type 2.

Both of type 1 and type 2 may be mapped to one or two symbols.

As shown in FIG. 6(a), in the case that a DMRS is mapped to one symbol in type 1, F-CDM (Frequency-Code Division Multiplexing) and FDM (Frequency Division Multiplexing) of length 2 on frequency axis may be used for multiplexing maximum four antenna ports, and in the case that the additional DMRS is not configured, the RS density of each antenna port per Resource Block (RB) is 6 REs.

In type 1, in the case that a DMRS is mapped to two symbols, F-CDM and FDM of length 2 on frequency axis may be used for multiplexing maximum eight antenna ports, and T-CDM of length 2 on time axis may be used.

In the case that the additional DMRS is not configured, the RS density of each antenna port per Resource Block (RB) is 8 REs.

As shown in FIG. 6(b), in the case that a DMRS is mapped to one symbol in type 2, F-CDM (Frequency-Code Division Multiplexing) and FDM (Frequency Division Multiplexing) of length 2 on frequency axis may be used for multiplexing maximum six antenna ports, and in the case that the additional DMRS is not configured, the RS density of each antenna port per Resource Block (RB) is 4 REs.

In type 2, in the case that a DMRS is mapped to two symbols, F-CDM and FDM of length 2 on frequency axis may be used for multiplexing maximum twelve antenna ports, and T-CDM of length 2 on time axis may be used.

In the case that the additional DMRS is not configured, the RS density of each antenna port per Resource Block (RB) is 8 REs.

FIG. 7 is a diagram illustrating one example of configuring antenna ports for transmitting a reference signal.

FIG. 7 illustrates a Front load DMRS of Type I constituted by two OFDM symbols.

As illustrated in FIG. 7, the Front load DMRS of Type I constituted by two symbols may be constituted by two combs and a maximum of four antenna ports are multiplexed per comb, and as a result, a total of eight antenna ports may be multiplexed.

Shaded resource elements (REs) mean comb 1 and non-shaded REs mean comb 2. Further, in the present disclosure, the antenna port means a virtual antenna, i.e., a logical antenna port.

Hereinafter, the present disclosure will be described based on comb 1. However, the present disclosure is not limited thereto and may be similarly applied even to comb 2.

When four antenna ports are multiplexed in comb 1, CDM having a length of 2 may be applied between adjacent REs in the same comb on the frequency axis. Further, the CDM having the length of 2 may be applied between adjacent symbols on the time axis.

In other words, four antenna ports for transmitting the reference signal may be multiplexed through OCC [1 1], [1 −1] on the time axis and OCC [1 1], [1 −1] on the frequency axis.

Specifically, as illustrated in FIG. 7, CDM spreading/dispreading may be performed in units of four REs (A, B, C, and D). In this case, a unit constituted by four REs is referred to an OCC unit.

In other words, the OCC unit means a set of REs in which the CDM having the length of 2 is applied on the frequency axis and the time axis.

For example, in FIG. 7, when four antenna ports (ports 1, 2, 3, and 4) are multiplexed, antenna ports 1, 2, 3, and 4 may be multiplexed through the following OCCs, respectively.

Port 1: F-OCC [1 1]+T-OCC [1 1]
Port 2: F-OCC [1 −1]+T-OCC [1 1]
Port 3: F-OCC [1 1]+T-OCC [1 −1]
Port 4: F-OCC [1 −1]+T-OCC [1 −1]

An F-OCC means an OCC when the CDM is applied on the frequency axis and a T-OCC means an OCC when the CDM is applied on the time axis.

In this case, ports 1, 2, 3, and 4 may be spread/dispread through OCCs (e.g., Walsh code) of [1 1 1 1], [1 1 −1 −1], [1 −1 1 −1], and [1 −1 −1 1] in REs A, B, C, and D, respectively.

The CDM may be repeatedly applied eve to the remaining subcarriers in the same unit.

When the CDM is applied through such a method, transmission powers between symbols to which the reference signal is mapped are unevenly allocated to reduce efficiency of a transmission power. In other words, an imbalance may occur between the transmission powers between the physical antenna ports in which the reference signal is substantially transmitted.

For example, if all precoders of respective layers applied to an n-th transmission antenna are 1, when ports 1, 2, 3, and 4 are spread and multiplexed by CDM thereof, the transmission power of each RE is as follows.

RE A: 1+1+1+1=4
RE B: 1+1 −1−1=0
RE C: 1 −1+1−1=0
RE D: 1 −1−1+1=0

As a result, a problem occurs in that the transmission power of a first symbol among symbols in which the front load DMRS is configured is configured larger than the transmission power of a second symbol.

Accordingly, there is a problem in that the imbalance may occur between the transmission powers of physical antennas in which the reference signal is substantially transmitted.

It is assumed that all precoders of respective layers applied to the n-th transmission antenna is 1, but such a problem may occur even in a case where a phase is changed at 180 degrees like a case where all precoder values are changed between k and −k.

There may be a problem in that when the phase is changed at 180 degrees, the transmission power increases in B, C, or D and the power decreases in the remaining REs.

Accordingly, the present disclosure proposes a method for making the balance between the transmission powers for transmitting the reference signal in order to solve such a problem.

Hereinafter, the present disclosure is described by taking the demodulation reference signal as an example, but the present disclosure may be applied even to other reference signals (e.g., CSI-RS, SRS, etc.).

FIG. 8 is a diagram illustrating one example of a method for determining transmission powers between antenna ports using an orthogonal cover code proposed in the present disclosure.

Referring to FIG. 8, the antenna ports for transmitting the reference signal, which are multiplexed through the CDM method may be applied by shifting the time axis OCC according to an index of the OCC unit.

Specifically, in FIG. 8, the OCC of the CDM applied to the RE is the time axis OCC and the frequency axis OCC is omitted. In FIG. 8, as the index of the subcarrier increases, the OCC units may be applied by alternately the time axis OCC per unit.

Hereinafter, in the present disclosure, an OCC value which is not shifted is referred to as a non-shifting OCC and an OCC value which is shifted is referred to as a shifting OCC.

For example, in FIG. 8, a first OCC unit may be applied to OCC [1 1] or [1 −1] on the time axis in RE A and RE B and OCC [1 1] or [1 −1] on the time axis may be applied to the first OCC unit in RE C and RE D.

The time axis OCC applied to the first OCC unit may be shifted and applied to a second OCC unit.

In other words, [1 1] or [−1 1] acquired by shifting a value of [1 1] or [1 −1] which is the time axis OCC applied to the first OCC unit may be applied to the second OCC unit.

For example, in FIG. 8, respective ports may be multiplexed through the following OCC values.

Even-numbered OCC unit:
Port 1: F-OCC [1 1]+T-OCC [1 1]
Port 2: F-OCC [1 −1]+T-OCC [1 1]
Port 3: F-OCC [1 1]+T-OCC [1 −1]
Port 4: F-OCC [1 −1]+T-OCC [1 −1]
Odd-numbered OCC unit:
Port 1: F-OCC [1 1]+T-OCC [1 1]
Port 2: F-OCC [1 −1]+T-OCC [1 1]
Port 3: F-OCC [1 1]+T-OCC [−1 1]
Port 4: F-OCC [1 −1]+T-OCC [−1 1]

Accordingly, ports 1, 2, 3, and 4 may be spread/dispread through the following OCCs in the respective REs.
Even-numbered OCC unit:
Port 1: [1 1 1 1]
Port 2: [1 1−1 −1]
Port 3: [−1 1−1 1]
Port 4: [−1 1 1 −1]

In this case, the transmission power of each RE is as follows.
Even-numbered OCC unit:
RE A: 1+1+1+1=4
RE B: 1+1 −1−1=0
RE C: 1 −1+1−1=0
RE D: 1 −1−1+1=0
Odd-numbered OCC unit:
RE A: 1+1 −1−1=4
RE B: 1+1+1+1=0
RE C: 1 −1−1+1=0
RE D: 1 −1+1−1=0

When the odd-numbered OCC unit and the even-numbered OCC unit are compared with each other, it may be verified that the transmission powers of RE A and RE B are exchanged and it may be verified that the transmission powers of RE C and RE D are exchanged.

As a result, it may be verified that the sums of the transmission powers of the symbol of the first DMRS and the symbol of the second DMRS are the same.

In FIG. 8, it is illustrated that two resource blocks (RBs) are adjacent to each other, but two RBs not adjacent to each other may be allocated according to a result of scheduling.

For example, even when RBs having indexes n and k are allocated, the index of the subcarrier increases regardless of continuity of the RBs, the OCC value on the time axis and the shifted OCC value are alternately applied to make the balance of the transmission powers of the symbols.

In the method described in FIG. 8, only when even RBs are allocated, the transmission power may be uniformly allocated for each symbol.

FIG. 9 is a diagram illustrating another example of a method for determining transmission powers between antenna ports using an orthogonal cover code proposed in the present disclosure.

Referring to FIG. 9, the antenna ports for transmitting the reference signal, which are multiplexed through the CDM method may be applied by shifting the time axis OCC according to the index of the subcarrier.

Specifically, when odd RBs are allocated, the transmission power of the symbol to which the reference signal is mapped is not uniformly allocated even though the method described in FIG. 8 is used.

Accordingly, even when the number of scheduled RBs is 1 or odd, as the index of the subcarrier increases in the same comb, the non-shifting OCC and the shifting OCC may be alternately applied per subcarrier in order to solve an imbalance problem of the transmission power.

In other words, as illustrated in FIG. 9, non-shifting OCC [1 1] or [1 −1] on the time axis may be applied to a first subcarrier and shifting OCC [1 1] or [−1 1] on the time axis may be applied to a second subcarrier in the same comb.

For example, when the reference signal is transmitted through ports 1 and 2, ports 1 and 2 may be multiplexed as below by using only the non-shifting OCC.
Port 1: F-OCC [1 1]+T-OCC [1 1]
Port 2: F-OCC [1 1]+T-OCC [1 −1]

In this case, since the transmission powers in REs A, B, C, and D are 2, 0, 2, and 0, respectively, the problem of the transmission power imbalance of the physical antenna port may occur.

Accordingly, in order to solve the problem, as illustrated in FIG. 9, as the index of the subcarrier increases in the same comb, when the non-shifting OCC and the shifting OCC are alternately used per subcarrier, the OCCs may be applied to ports 1 and 2 as below.
Even numbered subcarrier index in the same comb:
Port 1: F-OCC [1 1]+T-OCC [1 1]
Port 2: F-OCC [1 1]+T-OCC [1 −1]
Odd numbered subcarrier index in the same comb:
Port 1: F-OCC [1 1]+T-OCC [1 1]
Port 2: F-OCC [1 1]+T-OCC [−1 1]

In this case, since the transmission powers in REs A, B, C, and D are 2, 0, 0, and 2, respectively, the transmission power allocated to each symbol may be uniformly allocated for each symbol.

Alternatively, contrary to this, even when the shifting OCC is used in an even-numbered subcarrier index and the non-shifting OCC is used in the odd-numbered subcarrier index, the power transmission per symbol may be uniformly allocated.

Whether to apply the non-shifting OCC or the shifting OCC to the even or odd-numbered subcarrier index may be indicated to the UE by the BS.

Such a method may be similarly applied even to two ports of another comb using F-OCC [1 −1].

In the method of FIG. 9, when four antenna ports are multiplexed with one comb, the power allocated per symbol may be unbalanced, and as a result, the number of antenna ports multiplexed with one comb may be limited to two or less.

FIG. 10 is a diagram illustrating still yet another example of a method for determining transmission powers between antenna ports using an orthogonal cover code proposed in the present disclosure.

Referring to FIG. 10, the antenna ports for transmitting the reference signal, which are multiplexed through the CDM method may be applied by shifting the time axis and frequency axis OCCs according to the index of the OCC unit.

Specifically, the non-shifting OCC[1 1] [1 −1] and the shifting OCC[1 1] [−1 1] on the time axis may be applied to the OCC unit and the non-shifting OCC[1 1] [1 −1] and the shifting OCC[1 1] [−1 1] on the frequency axis may be applied to the OCC unit.

Hereinafter, the non-shifting OCC on the time axis is referred to as non-shifting T-OCC and the shifting OCC is referred to as shifting T-OCC.

Further, the non-shifting OCC on the frequency axis is referred to as non-shifting F-OCC and the shifting OCC is referred to as shifting F-OCC.

As illustrated in FIG. 10, for power balancing between the symbols, as the index of the subcarrier increases, the non-shifting OCC and the shifting OCC are alternately applied onto the time axis and the frequency axis per OCC unit, thereby making the transmission power allocated per symbol uniform.

Since the non-shifting OCC and the shifting OCC are present in T-OCC and the non-shifting OCC and the shifting OCC are present even in F-OCC, patterns of four following OCC values may be present by considering both the time axis and the frequency axis.

OCC pattern 1: non-shifting T-OCC+non-shifting F-OCC
OCC pattern 2: shifting T-OCC+non shifting F-OCC
OCC pattern 3: non-shifting T-OCC+shifting F-OCC
OCC pattern 4: shifting T-OCC+shifting F-OCC When the patterns of the OCC values are used, in FIG. 10, T-OCC [1 1] or [1 −1] may be applied to RE A and RE B in the first OCC unit and T-OCC [1 1] or [1 −1] may be applied to RE C and RE D in FIG. 10.

Further, F-OCC [1 1] or [1 −1] may be applied to RE A and RE C and F-OCC [1 1] or [1 −1] may be applied to RE B and RE D.

In the second OCC unit, T-OCC [1 1] or [−1 1] may be applied to RE A and RE C and T-OCC [1 1] or [−1 1] may be applied to RE C and RE D.

Further, F-OCC [1 1] or [1 −1] may be applied to RE A and RE C and F-OCC [1 1] or [1 −1] may be applied to RE B and RE D.

In the third OCC unit, T-OCC [1 1] or [1 −1] may be applied to RE A and RE C and T-OCC [1 1] or [1 −1] may be applied to RE C and RE D.

Further, F-OCC [1 1] or [−1 1] may be applied to RE A and RE C and F-OCC [1 1] or [−1 1] may be applied to RE B and RE D.

In the fourth OCC unit, T-OCC [1 1] or [−1 1] may be applied to RE A and RE B and T-OCC [1 1] or [−1 1] may be applied to RE C and RE D.

Further, F-OCC [1 1] or [−1 1] may be applied to RE A and RE C and F-OCC [1 1] or [−1 1] may be applied to RE B and RE D.

Consequently, each of OCC patterns 1, 2, 3, and 4 may be applied in turns per OCC unit and the OCC patterns may be applied to four inconsecutive or consecutive RBs in turns.

When such a method is used, symbols to which the reference signal is mapped in four RBs have the same transmission power.

As another embodiment of the present disclosure, only OCC patterns 1 and 4 may be alternately applied per OCC unit.

In this case, in FIG. 10, six OCC units may be present for RB n and RB n+1 and OCC patterns 1 and 4 are alternately applied to each of six OCC units (e.g., when the OCC patterns are applied to six OCC units in the order of pattern 1, pattern 4, pattern 1, pattern 4, pattern 1, and pattern 4), the transmission power imbalance problem between the symbols to which the reference signal is mapped may be solved.

A scheme applied to RB n and RB n+1 may be similarly applied to RB n+2 and RB n+3.

The methods described in FIGS. 8 to 10 are described based on mapping type 1 of the DMRS, but may be similarly applied even in mapping type 2 of the DMRS.

Hereinafter, the case of mapping type 2 of the DMRS will be described.

FIG. 11 is a diagram illustrating still yet another example of a method for determining transmission powers between antenna ports using an orthogonal cover code proposed in the present disclosure.

Referring to FIG. 11, when the mapping type of the DMRS is 2, the antenna ports for transmitting the reference signal, which are multiplexed through the CDM method may be applied by shifting the time axis and frequency axis OCCs according to the index of the OCC unit.

Specifically, when the mapping type of the DMRS is 2, OCC patterns 1 to 4 may be applied in turn per OCC unit similarly to the method described in FIG. 10 and the OCC pattern may be applied even to two consecutive or inconsecutive RBs in turn.

When the OCC is applied through such a method, the transmission powers of the symbols to which the reference signal is mapped may be evenly allocated.

FIG. 12 is a diagram illustrating another example of a method for determining transmission powers between antenna ports using an orthogonal cover code proposed in the present disclosure.

Referring to FIG. 12, when the mapping type of the DMRS is type 2, only OCC patterns 1 and 4 may be alternately applied per OCC unit.

Specifically, when two OCC units are present for each of RB n and RB n+1, if OCC patterns 1 and 4 are applied to each OCC unit, the transmission powers of the symbols may be uniform.

In FIGS. 7 to 12, a case where the number of RBs is 1, 2, or 4 is described as an example, but in this case, one cycle to which the method of shifting the OCC value is applied is just described and when the number of scheduled RBs is plural, the methods described in FIGS. 7 to 12 may be individually applied and performed repeatedly at several cycles.

As another embodiment of the present disclosure, only the non-shifting T-OCC is used and the DMRS ma be mapped to the RE alternately per specific resource unit.

In this case, for the mapping of the DMRS to the RE, there may be a conventional mapping method (i.e., non-shifting RE mapping) and a mapping method (i.e., shifting RE mapping) in which locations of two symbols are changed.

In this case, two RE mapping methods may be alternately applied per specific resource unit.

Further, in the present disclosure, when T-OCC is applied to two symbols and T-OCC is applied to n OSs, there may be non-shifting RE mapping, 1 symbol cyclic shifting RE mapping, 2 symbol cyclic shifting RE mapping, and n−1 symbol cyclic shifting RE mapping methods in respect to the mapping of the RE and the balancing of the transmission powers of the symbols may be made using changing and using various RE mapping methods per specific resource unit.

FIG. 13 is a flowchart showing one example of a method for receiving a reference signal by a UE, which is proposed in the present disclosure. FIG. 13 is just for convenience of the description and does not limit the scope of the present disclosure.

Referring to FIG. 13, the corresponding UE and BS may perform the method(s) described in the embodiments of the present disclosure. In particular, the corresponding UE and BS may support the methods described in FIGS. 7 to 12. In FIG. 13, a detailed description duplicated with the contents associated with the methods is omitted.

First, the UE may receive control information from the BS (S13010).

In this case, the control information may indicate whether to the non-shifting OCC or shifting OCC to the OCC unit or subcarrier as described in FIGS. 7 to 12.

Thereafter, the UE receives a reference signal based on the control information (S13020). In this case, as described in FIGS. 7 to 13, the reference signal is transmitted on a specific antenna port and is positioned in the same symbol, on a time axis, and in the same subcarrier, on a frequency axis, as a different reference signal transmitted on at least one other antenna port.

Further, as described in FIG. 9, an Orthogonal Cover Code (OCC) is applied to the specific antenna port and at least one other antenna port and multiplexed through a Code Division Multiplexing (CDM) scheme and the OCC or a value acquired by shifting the OCC is applied to the subcarrier according to the index of the subcarrier.

Overview of Devices to which Present Disclosure is Applicable

FIG. 14 illustrates a block diagram of a wireless communication device to which methods proposed in the present disclosure may be applied.

Referring to FIG. 14, a wireless communication system includes an eNB 1410 and multiple UEs 1410 positioned within an area of the eNB 1420.

Each of the eNB and the UE may be expressed as a wireless device.

The eNB 1410 includes a processor 1411, a memory 1412, and a radio frequency (RF) module 1413. The processor 1411 implements a function, a process, and/or a method which are proposed in FIGS. 1 to 15 above. Layers of a radio interface protocol may be implemented by the processor. The memory 1412 is connected with the processor to store various information for driving the processor. The RF module 1413 is connected with the processor to transmit and/or receive a radio signal.

The UE 1420 includes a processor 1421, a memory 1422, and an RF module 1423.

The processor 1421 implements a function, a process, and/or a method which are proposed in FIGS. 1 to 13 above. Layers of a radio interface protocol may be implemented by the processor. The memory 1422 is connected with the processor to store various information for driving the processor. The RF module 1423 is connected with the processor to transmit and/or receive a radio signal.

The memories 1412 and 1422 may be positioned inside or outside the processors 1411 and 1421 and connected with the processors 1411 and 1421 by various well-known means.

Further, the eNB 1410 and/or the UE 1420 may have a single antenna or multiple antennas.

FIG. 15 is a block diagram of a communication device according to an embodiment of the present disclosure.

In particular, FIG. 15 is a diagram more specifically illustrating the UE of FIG. 14 above.

Referring to FIG. 15, the UE may be configured to include a processor (or a digital signal processor (DSP) 1510, an RF module (or RF unit) 1535, a power management module 1505, an antenna 1540, a battery 1555, a display 1515, a keypad 1520, a memory 1530, a subscriber identification module (SIM) card 1525 (This component is optional), a speaker 1545, and a microphone 1550. The UE may also include a single antenna or multiple antennas.

The processor 1510 implements a function, a process, and/or a method which are proposed in FIGS. 7 to 13 above. The layers of the radio interface protocol may be implemented by the processor.

The memory 1530 is connected with the processor and stores information related with an operation of the processor. The memory 1530 may be positioned inside or outside the processor and connected with the processor by various well-known means.

A user inputs command information such as a telephone number or the like by, for example, pressing (or touching) a button on the keypad 1520 or by voice activation using the microphone 1550. The processor receives such command information and processes to perform appropriate functions including dialing a telephone number. Operational data may be extracted from the SIM card 1525 or the memory 1530.

In addition, the processor may display command information or drive information on the display 1515 for the user to recognize and for convenience.

The RF module 1535 is connected with the processor to transmit and/or receive an RF signal. The processor transfers the command information to the RF module to initiate communication, for example, to transmit radio signals constituting voice communication data. The RF module is constituted by a receiver and a transmitter for receiving and transmitting the radio signals. The antenna 1540 functions to transmit and receive the wireless signals. Upon receiving the radio signals, the RF module may transfer the signal for processing by the processor and convert the signal to a baseband. The processed signal may be converted into to audible or readable information output via the speaker 1545.

FIG. 16 is a diagram illustrating one example of an RF module of a wireless communication device to which a method proposed in the present disclosure may be applied.

Specifically, FIG. 16 illustrates an example of an RF module that may be implemented in a frequency division duplex (FDD) system.

First, in a transmission path, the processors described in FIGS. 14 and 15 process the data to be transmitted and provide an analog output signal to the transmitter 1610.

Within the transmitter 1610, the analog output signal is filtered by a low pass filter (LPF) 1611 to remove images caused by a digital-to-analog conversion (ADC) and up-converted to an RF from a baseband by an up-converter (mixer) 1612, and amplified by a variable gain amplifier (VGA) 1613 and the amplified signal is filtered by a filter 1614, additionally amplified by a power amplifier (PA) 1615, routed through a duplexer(s) 1650/an antenna switch (es) 1660, and transmitted through an antenna 1670.

In addition, in a reception path, the antenna 1670 receives signals from the outside and provides the received signals, which are routed through the antenna switch(es) 1660/duplexers 1650 and provided to a receiver 1620.

In the receiver 1620, the received signals are amplified by a low noise amplifier (LNA) 1623, filtered by a bans pass filter 1624, and down-converted from the RF to the baseband by a down-converter (mixer) 1625.

The down-converted signal is filtered by a low pass filter (LPF) 1626 and amplified by a VGA 1627 to obtain an analog input signal, which is provided to the processors described in FIGS. 14 and 15.

Further, a local oscillator (LO) generator 1640 also provides transmitted and received LO signals to the up-converter 1612 and the down-converter 1625, respectively.

In addition, a phase locked loop (PLL) 1630 receives control information from the processor to generate the transmitted and received LO signals at appropriate frequencies and provides control signals to the LO generator 1640.

Further, circuits illustrated in FIG. 16 may be arranged differently from the components illustrated in FIG. 16.

FIG. 17 is a diagram illustrating another example of the RF module of the wireless communication device to which the method proposed in the present disclosure may be applied.

Specifically, FIG. 17 illustrates an example of an RF module that may be implemented in a time division duplex (TDD) system.

A transmitter 1710 and a receiver 1720 of the RF module in the TDD system are identical in structure to the transmitter and the receiver of the RF module in the FDD system.

Hereinafter, only the structure of the RF module of the TDD system that differs from the RF module of the FDD system will be described and the same structure will be described with reference to a description of FIG. 16.

A signal amplified by a power amplifier (PA) 1715 of the transmitter is routed through a band select switch 1750, a band pass filter (BPF) 1760, and an antenna switch(es) 1770 and transmitted via an antenna 1780.

In addition, in a reception path, the antenna 1780 receives signals from the outside and provides the received signals, which are routed through the antenna switch(es) 1770, the band pass filter 1760, and the band select switch 1750 and provided to the receiver 1720.

In the embodiments described above, the components and the features of the present disclosure are combined in a predetermined form. Each component or feature should be considered as an option unless otherwise expressly stated. Each component or feature may be implemented not to be associated with other components or features. Further, the embodiment of the present disclosure may be configured by associating some components and/or features. The order of the operations described in the embodiments of the present disclosure may be changed. Some components or features of any embodiment may be included in another embodiment or replaced with the component and the feature corresponding to another embodiment. It is apparent that the claims that are not expressly cited in the claims are combined to form an embodiment or be included in a new claim by an amendment after the application.

The embodiments of the present disclosure may be implemented by hardware, firmware, software, or combinations thereof. In the case of implementation by hardware, according to hardware implementation, the exemplary embodiment described herein may be implemented by using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

In the case of implementation by firmware or software, the embodiment of the present disclosure may be implemented in the form of a module, a procedure, a function, and the like to perform the functions or operations described above. A software code may be stored in the memory and executed by the processor. The memory may be positioned inside or outside the processor and may transmit and receive data to/from the processor by already various means.

It is apparent to those skilled in the art that the present disclosure may be embodied in other specific forms without departing from essential characteristics of the present disclosure. Accordingly, the aforementioned detailed description should not be construed as restrictive in all terms and should be exemplarily considered. The scope of the present disclosure should be determined by rational construing of the appended claims and all modifications within an equivalent scope of the present disclosure are included in the scope of the present disclosure.

INDUSTRIAL APPLICABILITY

Although the beam management method in the wireless communication system of the present disclosure has been described with reference to an example applied to a 3GPP LTE/LTE-A system or a 5G system (New RAT system), the method may be applied to various wireless communication systems in addition to the 3GPP LTE/LTE-A system or 5G system.

The invention claimed is:
1. A method for transmitting/receiving a reference signal by a terminal in a wireless communication system, the method comprising:
   receiving control information from a base station; and
   receiving the reference signal based on the control information,
   wherein a plurality of antenna ports related to the reference signal is multiplexed in resource elements (REs) according to a specific comb,
   wherein the multiplexing is performed based on code division multiplexing (CDM) by applying an orthogonal cover code (OCC),
   wherein the OCC is applied based on a specific index related to the REs,
   wherein the specific index related to the REs is based on an index of a subcarrier related to an OCC unit which is comprised of specific REs among the REs,
   wherein the specific REs are based on a number of the plurality of antenna ports, and
   wherein a value of the applied OCC is a first value or a second value and the second value is a shifted value of the first value.

2. The method of claim 1,
   wherein when the specific index is an even number, the OCC based on the second value is applied, and
   wherein when the specific index is an odd number, the OCC based on the first value is applied.

3. The method of claim 2, wherein the OCC based on the second value is [1 −1], and the OCC based on the first value is [−1 1].

4. The method of claim 1,
   wherein when the specific index is the odd number, the OCC based on the second value is applied, and
   wherein when the specific index is the even number, the OCC based on the first value is applied.

5. The method of claim 4, wherein the OCC based on the second value is [1 −1], and the OCC based on the first value is [−1 1].

6. The method of claim 1, wherein the number of the plurality of antenna ports is two or less.

7. The method of claim 1 further comprising:
   receiving information from the base station indicating whether to apply i) the OCC based on the first value or ii) the OCC based on the second value.

8. The method of claim 1, wherein the reference signal is a Demodulation Reference Signal (DMRS) for demodulation of data.

9. A terminal transmitting/receiving a reference signal in a wireless communication system, the terminal comprising:
   a transmitter and receiver for transmitting and receiving a radio signal; and
   a processor controlling the transmitter and receiver,
   wherein the processor is configured to:
   receive control information from a base station, and
   receive the reference signal based on the control information,
   wherein a plurality of antenna ports related to the reference signal is multiplexed in resource elements (REs) according to a specific comb,
   wherein the multiplexing is performed based on code division multiplexing (CDM) by applying an orthogonal cover code (OCC),
   wherein the OCC is applied based on a specific index related to the REs,
   wherein the specific index related to the REs is based on an index of a subcarrier related to an OCC unit which is comprised of specific REs among the REs, wherein the specific REs are based on a number of the plurality of antenna ports, and wherein a value of the applied OCC is a first value or a second value and the second value is a shifted value of the first value.

10. The terminal of claim 9, wherein when the specific index is an even number, the OCC based on the second value is applied, and wherein when the specific index is an odd number, the OCC based on the first value is applied.

11. The terminal of claim 10, wherein when the specific index is the odd number, the OCC based on the second value is applied, and wherein when the specific index is the even number, the OCC based on the first value is applied.

12. The terminal of claim 11, wherein the OCC based on the second value is [1 −1], and the OCC based on the first value is [−1 1].

13. The terminal of claim 9, wherein the OCC based on the second value is [1 −1], and the OCC based on the first value is [−1 1].

14. The terminal of claim 9, wherein the number of the plurality of antenna ports is two or less.

15. The terminal of claim 9, wherein the processor is further configured to receive information from the base station indicating whether to apply i) the OCC based on the first value or ii) the OCC based on the second value.

16. The terminal of claim 9, wherein the reference signal is a Demodulation Reference Signal (DMRS) for demodulation of data.

* * * * *